(12) United States Patent
Rose

(10) Patent No.: US 8,760,634 B2
(45) Date of Patent: Jun. 24, 2014

(54) OPTICAL SYNTHETIC APERTURE RADAR

(75) Inventor: David W. Rose, Glendale, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 308 days.

(21) Appl. No.: 13/284,355

(22) Filed: Oct. 28, 2011

(65) Prior Publication Data

US 2013/0106650 A1    May 2, 2013

(51) Int. Cl.
*G01C 3/08* (2006.01)
(52) U.S. Cl.
USPC .......... 356/5.01; 356/3.01; 356/4.01; 356/5.1
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,687,281 A | 8/1987 | Gross | |
| 4,707,697 A | 11/1987 | Coulter et al. | |
| 5,132,686 A | 7/1992 | Witte | |
| 6,222,933 B1 | 4/2001 | Mittermayer et al. | |
| 6,870,499 B2 | 3/2005 | Burns | |
| 6,879,279 B2 | 4/2005 | Stappaerts | |
| 7,787,773 B1 | 8/2010 | Kondo et al. | |
| 2008/0084551 A1* | 4/2008 | Harnisch | ...................... 356/4.01 |
| 2010/0110208 A1 | 5/2010 | Gerwe | |

FOREIGN PATENT DOCUMENTS

JP    A-2008-70344    3/2008

* cited by examiner

*Primary Examiner* — Luke Ratcliffe
(74) *Attorney, Agent, or Firm* — Oblon, Spivak, McClelland, Maier & Neustadt, L.L.P.

(57) ABSTRACT

An optical SAR transmits toward a target an amplitude modulated optical signal. Modulation of optical signals may be performed using light emitting devices such as semiconductor laser diodes driven by a modulation signal so that the emitted optical signal intensity is amplitude modulated. Transmitted optical signals are reflected from a target, and reflected optical signals are detected by light detecting devices such as photodiodes that detect and automatically demodulate the reflected optical signals. Optical elements such as a polarizer, a lens, and a frequency filter such as a color filter may optically process the amplitude modulated optical signal before transmission and detection. This technique achieves the potential benefits of an optical SAR, such as high resolution, better image quality, and elimination of electromagnetic interference, while circumventing many of the problems traditionally associated with optical SARs, such as the requirement for optical coherence and extremely accurate platform motion measurements.

15 Claims, 15 Drawing Sheets

OPTICAL SYNTHETIC APERTURE RADAR

BACKGROUND

Synthetic Aperture Radar (SAR) is a radar technique that achieves the effect of a large aperture antenna by using a relatively small aperture antenna that is physically moved along a path. By combining the information from many pulses transmitted along the path, a SAR can synthesize the performance of a single large aperture antenna. SAR has been effectively used in airplanes and satellites to generate images of ground targets, for example.

SUMMARY

An optical SAR is disclosed that transmits an amplitude modulated optical signal toward a target. Forming a SAR image directly at optical wavelengths is difficult because platform motion must be measured with accuracy related to the wavelength of the optical signal, which is in the micron range. However, transmitting an optical signal that is modulated with a much lower frequency SAR waveform takes advantage of benefits of optical signals such as small aperture size and low weight while avoiding drawbacks such as mentioned above.

Modulation of optical signals may be performed using light emitting devices such as one or more light emitting diodes (LEDs) or laser diodes, for example. An LED or laser diode may be driven by a modulation signal via an amplifier so that the emitted optical signal intensity is amplitude modulated accordingly. The transmitted optical signals are reflected from a target, and the reflected optical signals are detected by light detecting devices such as photodiodes, for example. Photodiodes receive and automatically demodulate the reflected amplitude modulated optical signals. The optical SAR requires simple hardware to amplitude modulate an optical signal, and to recover the modulation from an amplitude modulated optical signal without the necessity of a coherent optical receiver.

The optical SAR may comprise a transmitter and a receiver. The transmitter is capable of generating an optical amplitude modulated signal by amplitude modulating the optical signal with the SAR waveform modulation signal and transmitting the amplitude modulated signal. The transmitted optical signal travels out to the target, and a portion of the transmitted optical signal reflects off the target and is received by the receiver. The receiver detects the received optical signal and demodulates it, thus recovering the original SAR waveform modulation signal. The optical SAR also may include a SAR computer that processes the received and demodulated SAR-waveform to generate an image and information such as target recognition, and moving-target information, for example.

The optical signal source may be any light-generating device that can be amplitude modulated such as the LED or laser diode examples mentioned above. The modulation waveform used to modulate the optical signal can be a linear chirp, for example. In general, any modulation waveform can be used, as long as its autocorrelation function is high at zero shift, and low everywhere else. Optical elements such as a polarizer, a lens, and a frequency filter such as a color filter may optically process the amplitude modulated optical signal before transmission and/or detection. The target may be interrogated with different optical signal properties that separate materials having different responses to the different optical signal properties, such as color or polarization. In this way, more accurate target recognition may be achieved.

Additionally, the bandwidth of the amplitude modulation signal may be set to be much higher than the bandwidth of conventional SAR signals, so that a dramatic increase of image resolution can be achieved. The optical SAR avoids object image variations resulting from capturing reflected light radiated from the sun, for example, that adversely affects optical imaging techniques. Sun angle, cloud cover, etc. all affect image properties that makes automated image interpretation difficult for optical imaging, but does not affect SAR imaging.

BRIEF DESCRIPTION OF THE DRAWINGS

Exemplary embodiments are described in detail below with reference to the accompanying drawings wherein like numerals reference like elements, and wherein.

DETAILED DESCRIPTION OF EMBODIMENTS

Figure 1:
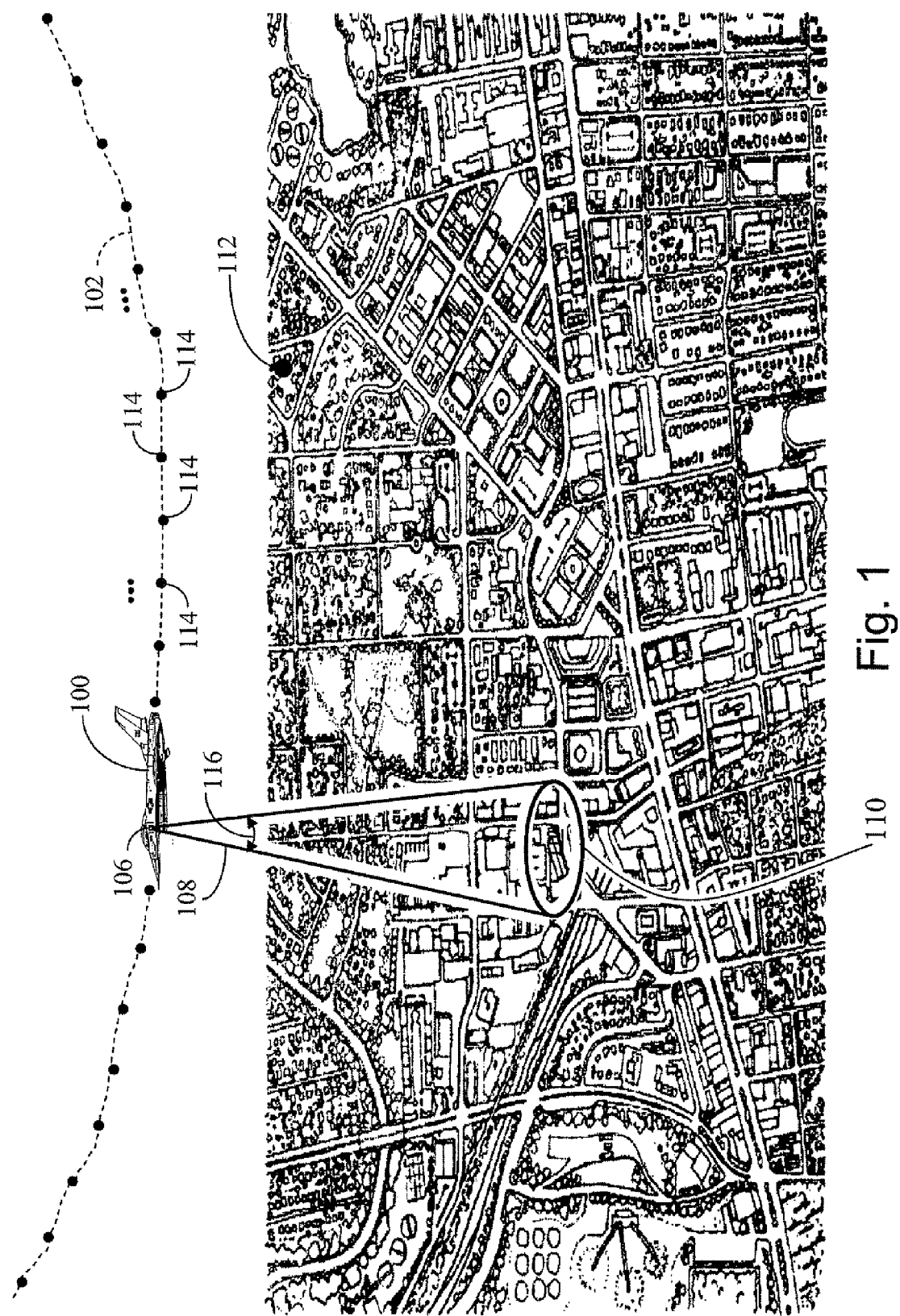
FIG. 1 shows an exemplary optical SAR operation.

FIG. 1 shows an airplane 100 flying along a path 102. An optical SAR 106 mounted in airplane 100 transmits an amplitude modulated optical signal in the form of a beam 108 toward target 110 of ground area 112, and subsequently receives a reflected optical signal. The transmitted beam 108 has an illumination angle 116 designed to illuminate the target area of interest 110. Optical SAR 106 performs the above transmit and receive operations repeatedly at points 114 along path 102 and processes the reflected optical signals resulting from a set number of points 114 to form an image and/or to generate other information such as moving target indications.

Optical SAR 106 forms beam 108 using optical signals instead of radio frequency (RF) signals to benefit from optical signal properties such as physical size and weight of required hardware. For example, as is well known in the art, the size of an antenna required to transmit a signal of a particular beamwidth is proportional to the wavelength of the transmitted signal. Because optical signals have a much smaller wavelength than that of RF signals, a transducer that transmits beam 108 can be physically much smaller than if RF signals were transmitted. Reduction in size leads naturally to reduction in weight.

Other benefits of using optical signals can also be obtained such as better image quality, improvement in moving target indication (MTI), avoidance of bandwidth interference with other communication and navigation systems operating in particular geographical areas, fully polarimetric SAR capability, and multi-spectral images. Each of these is briefly discussed below.

Images in a SAR that operate using RF signals (RF-SAR) suffer from image degradation known as Pulse Repetition Frequency Ambiguity (PRFA) which are artifacts caused by a lack of beam pattern control resulting in illumination of objects outside the desired image area. For optical signals, beam 108 can be precisely controlled and thus PRFA may be virtually eliminated.

Further, image quality may be degraded by scintillation caused by multiple scattering centers in a resolution cell that come in and out of phase over an aperture of the RF-SAR. This scintillation degradation may be reduced or eliminated by using a 50% bandwidth, i.e., a bandwidth that spans a full octave frequency range. This technique is difficult to achieve for RF-SAR due to antenna design and spectrum allocations. However, octave bandwidth is easily achieved for the modulation waveform of an optical SAR.

Another source of image degradation is "flashes" caused by dihedral or trihedral reflections from sides of buildings and then off the ground. Such reflections are possible for RF SARs because the buildings and ground act as smooth, mirror-like surfaces at RF wavelengths. At optical frequencies, very few things appear smooth, thus "flashes" may be significantly avoided and image quality improved.

RF-SAR may be used to detect moving targets. However, an illumination angle 116 for RF-SARs is relatively large, which only allows motion detection for targets moving at relatively high speeds. An illumination angle 116 for optical SAR 106 may be made much smaller than for an RF SAR, and thus provide detection of targets moving at much lower velocities.

RF signals transmitted by RF-SAR may interfere with communications and navigation equipment either onboard the platform operating the RF-SAR or operating in the geographical area near the target of interest. For example, FCC and/or FAA permission may be required before an RF-SAR can even be operated. In some situations, an RF-SAR is required to have gaps in their transmission spectrum, which degrades image quality. Using optical signals of optical SAR 106 eliminates this interference problem.

Polarities of optical signals may be easily controlled, so that beam 108 may be controlled to be horizontally, vertically or circularly polarized, for example, and light reflected from a target area may be received in specified polarities. Since polarization characteristics of various objects are different at different frequencies, optical SAR 106 may provide rich information regarding targets that cannot be obtained at RF frequencies.

In addition to polarization, multi- or hyper-spectral SAR may be used. Such a SAR would transmit optical signals at multiple wavelengths over the same aperture and directed toward the same target, thus producing a SAR image at each wavelength. This may be used, for example, to discriminate natural foliage from a camouflage net based on reflectivity differences at different frequencies. If red, green and blue optical frequencies are used, a true-color optical SAR image may be generated.

Optical SAR 106 also may take advantage of SAR properties to overcome electro-optics (EO) imaging drawbacks. For example, PO imaging forms images depending on reflected light or, in the case of InfraRed (IR) imaging, black body radiation. The appearance of objects in such images varies due to the angle of illumination, cloud cover, temperature variations, shadows, range, atmospheric conditions, etc. These changes in appearance make it difficult to implement automated image interpretation. However, SAR images do not suffer from the above variations. Thus, optical SAR 106 generated images are suitable for automatic target recognition and automatic change detection.

Advantageously, as is discussed below, optical SAR 106 receives the reflected signals and generates received data that conventional SAR systems could process. Thus, existing SAR processing may be applied to the received data generated by optical SAR 106 including large suits of exploitation tools already developed for SAR. For example, tools such as Coherent Change Detection (CCD), red-blue multi-view, moving target indication (MTI), automatic target detection (ATD), and various mensuration tools may be applied to the received data generated by optical SAR 106.

Figure 2:
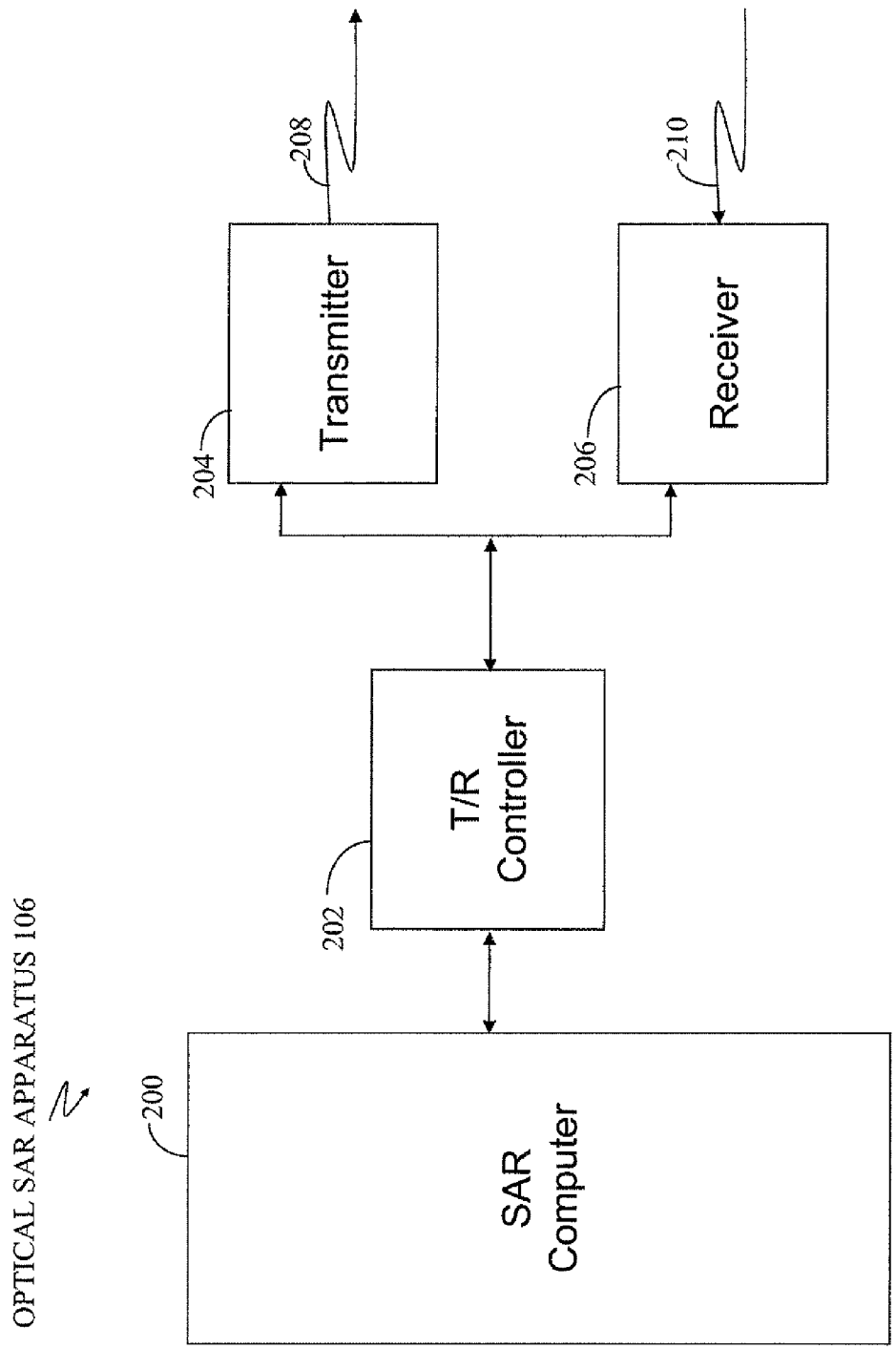
FIG. 2 shows an exemplary block diagram of an optical SAR apparatus.

FIG. 2 shows an exemplary block diagram of optical SAR 106 that may include a SAR computer 200, a transmit/receive (T/R) controller 202, transmitter 204 and receiver 206. SAR computer 200 may be implemented by a general purpose computer or a specialized computer designed specifically for efficient processing of SAR related algorithms such as SAR image generation, automatic target recognition, movement target indication, etc. as mentioned above.

SAR computer 200 interfaces with an operator who commands an optical SAR operation by specifying beam aim-point, image size, and image resolution parameters, for example. SAR computer 200 generates operational parameters for T/R controller 202 to execute the commands and then waits to receive SAR-data from T/R controller 202. T/R controller 202 initializes transmitter 204 and receiver 206 and starts the commanded SAR operation. Transmitter 204 transmits an amplitude modulated optical signal 208 as beam 108 that is directed at target 110, for example. Receiver 206 receives reflected optical signals 210, converts reflected optical signals 210 into digital SAR data, and forwards the SAR-data to SAR computer 200 via T/R controller 202. When received, SAR computer 200 processes the SAR-data based on the operator commands. For example, the operator commands may have specified various types of displays to be generated and specific detection processes to be performed such automatic target recognition or motion target indication.

Figure 3:
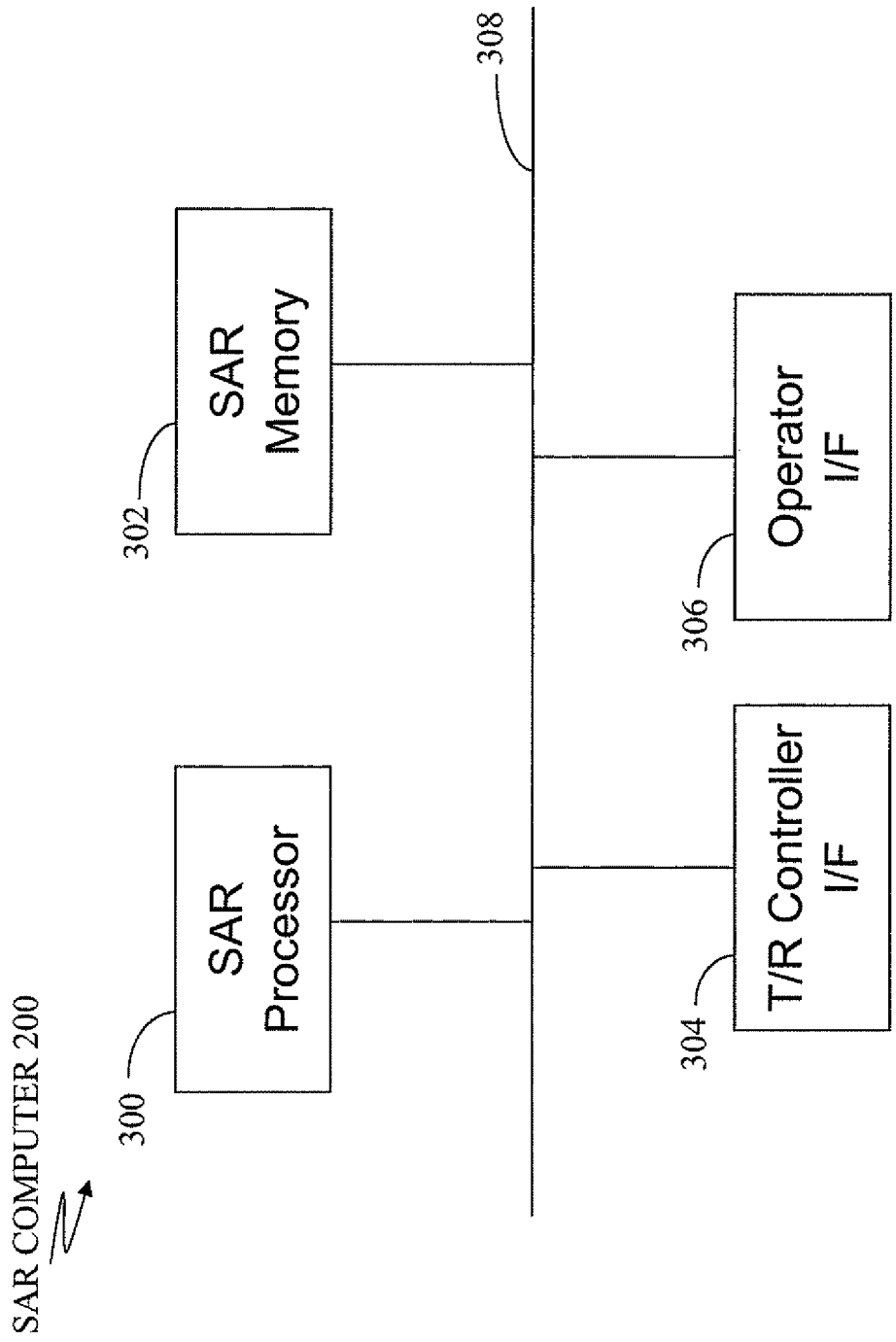
FIG. 3 shows an exemplary block diagram of a SAR computer.

FIG. 3 shows an exemplary block diagram of SAR computer 200 that may include a SAR processor 300, a SAR memory 302, a T/R controller interface (I/F) 304 and an operator I/F 306. These components are connected together by a bus 308 configured in a bus architecture. The bus architecture is shown as an example for ease of explanation. Other types of connections may be used as is well known in the computer architecture art. For example, depending on bandwidth requirements, SAR memory may require a dedicated direct memory access (DMA) port to support high data rates from T/R controller I/F 304. SAR processor 300 may be implemented by using a general-purpose computer or specialized computers implemented by hardware components such as Application Specific Integrated Circuits (ASICs), PLAs, PALs, FPGAs, etc as is well known in the computer art. The functions needed for SAR processing may be implemented using software programs executing in either the general purpose or the special purpose computers. These programs may be stored in a computer readable medium and loaded into the computer for execution.

Additionally, SAR memory 302 may be any type of memory that can support the data rates that are required for a SAR operation. For example, SAR memory 302 can be implemented by using dynamic or static solid-state memory, programmable read/write memory and/or disk memory, for example. If the speeds of a mass storage is not fast enough, a form of cache using high speed memory can be used.

In the example shown in FIG. 3, SAR memory 302 stores the SAR-data received from receiver 206. When the SAR operation is completed for all points 114 of the commanded synthetic aperture, T/R controller 202 sends a completion message to SAR processor 300 through T/R controller I/F 304. SAR processor 300 then begins to process the SAR-data to generate the commanded displays and other processing operations. Although the above example contemplates processing the SAR-data after the data is collected from all points 114, SAR processor 300 may process SAR-data on the fly after sufficient data is collected. In this way, results of the SAR operation may be made available faster than if SAR processor 300 waited until data is collected from all points 114. Thus, in the example shown in FIG. 3, SAR memory 302 stores the SAR-data received from receiver 206. As the SAR pulses are collected from points 114 of the synthetic aperture, the T/R controller 202 notifies SAR processor 300 through T/R controller IF 302. SAR processor 300 then begins to process the SAR-data to generate the image and other SAR products.

Figure 4:
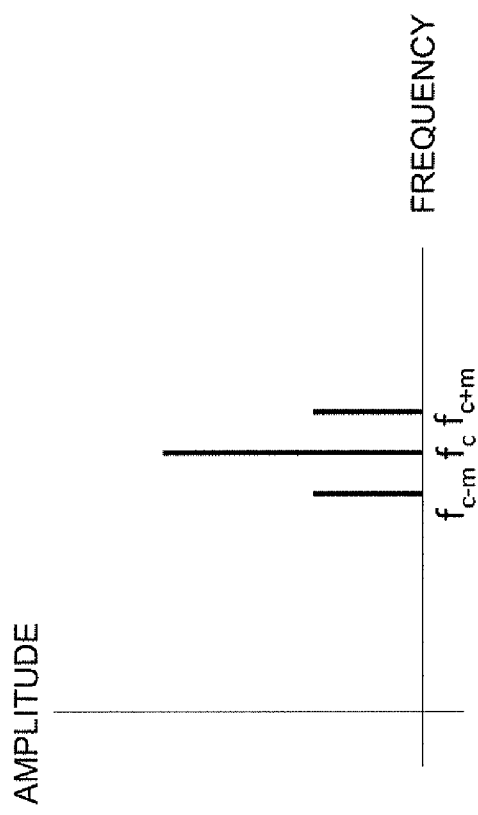
FIG. 4 shows an exemplary frequency domain diagram of an amplitude modulated signal having a carrier and 2 side bands.
Figure 5:
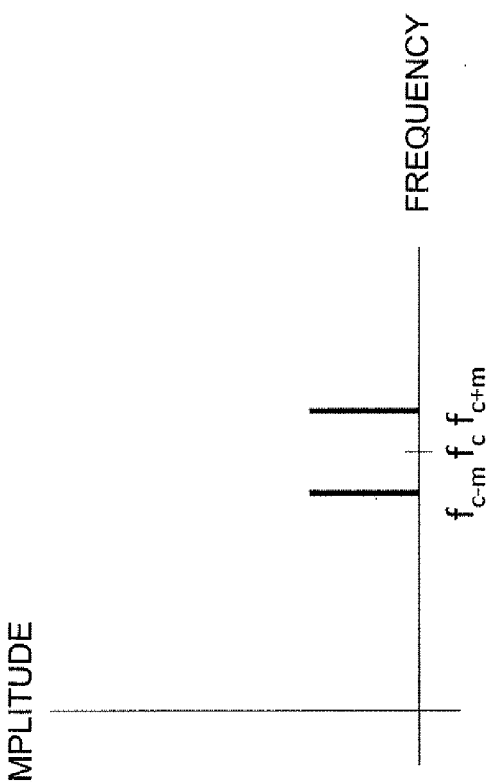
FIG. 5 shows an exemplary frequency domain diagram of a carrier suppressed modulated signal with only 2 side bands.

Optical SAR 106 transmits an amplitude-modulated optical signal as beam 108. As shown in FIG. 4, amplitude modulation of a carrier signal generates 2 side bands one above and one below a carrier signal frequency, $f_c$. Each of the side bands is separated by a modulation frequency, $f_m$, from the carrier signal frequency $f_c$. This double side band amplitude modulation (DSBAM) is different from other types of modulation such as double side band suppressed carrier (DSBSC) where the carrier signal is missing, as shown in FIG. 5. This is a significant difference, because the DSBAM optical signal can be more easily generated in the transmitter, and more easily recovered in the receiver compared to DSBSC. In particular, the DSBAM signal can be generated by, for example, modulating the power that drives the light emitting device, without the need for components such as optical mixers. Also, the modulation can be recovered from a DSBAM signal using a simple envelope detector, without the need for a coherent local oscillator to regenerate the carrier as is required in DSBSC. Thus, the amplitude modulated optical signal permits relatively simple designs for transmitter 204 and receiver 206.

The frequency of the optical signal is much higher than a frequency of SAR signals that modulate the optical signal. The resolution of SAR images is determined by the bandwidth of the transmitted SAR signal. The resolution of SAR images generated by optical SAR 106 can be superior to that of RF-SAR because the optical signal can be modulated at an extremely high rate. For example, optical signals generated by a laser can be modulated by a signal sweeping from between about 1 GHz to 6 GHZ, achieving a range resolution of about 3 centimeters.

Figure 6:
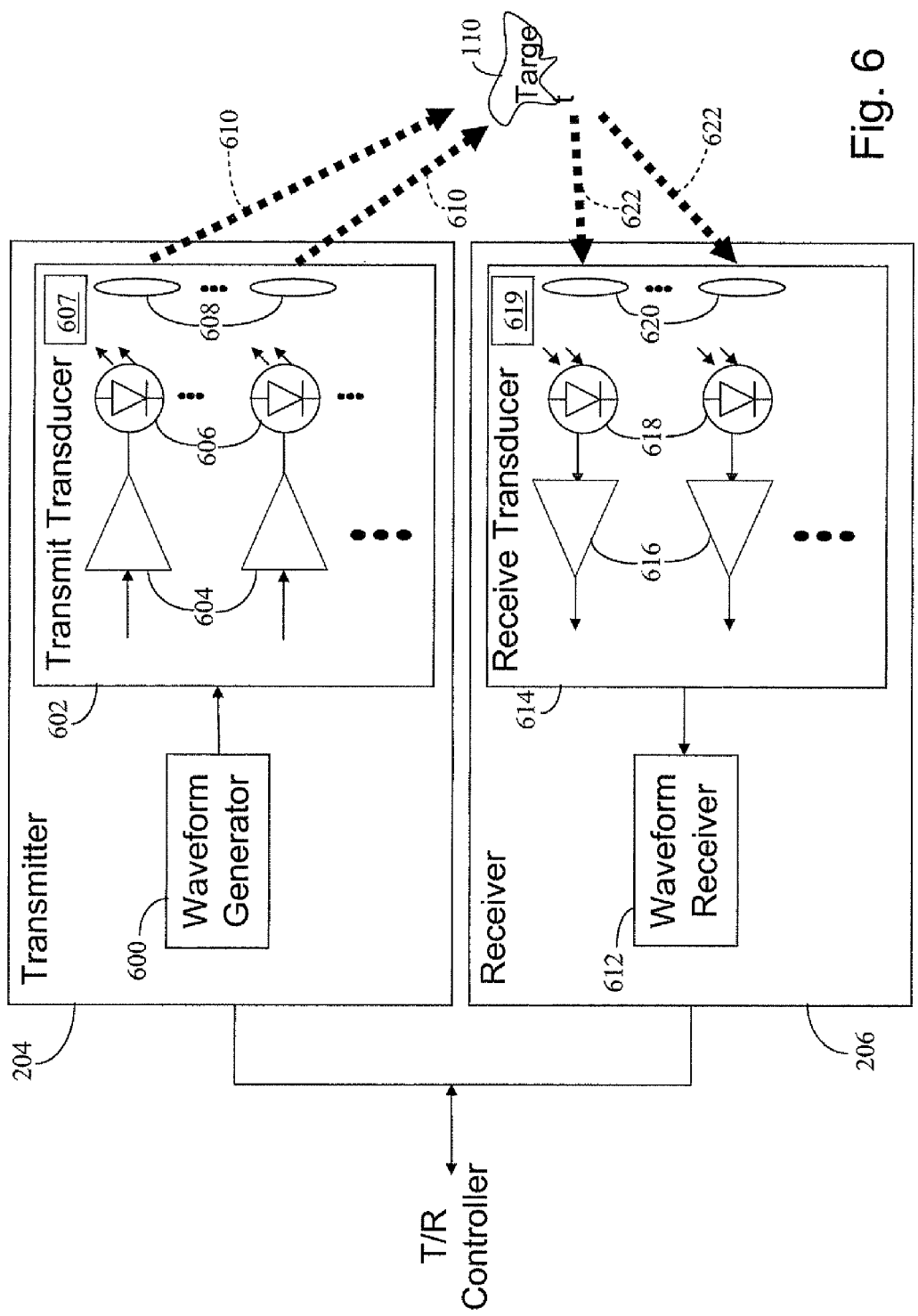
FIG. 6 shows an exemplary block diagram of a transmitter and a receiver.

An example of the transmitter and receiver is shown in FIG. 6. Here, transmitter 204 generates an amplitude modulated optical signal by driving transmit-transducer 602 with a modulation signal output from a waveform generator 600. Transmit-transducer 602 includes one or more devices such as semiconductor laser diodes 606 that are driven by amplifier 604. Thus, light that is emitted by laser diodes 606 is a carrier signal that is amplitude modulated in accordance with the modulation signal and transmitted through one or more optical elements 608 as optical signals 610 to form beam 108. Other types of light emitting devices may be used such as Light Emitting Diodes (LEDs), solid-state lasers, gas lasers, fiber lasers, etc. In fact, any light-emitting device in which the emitted light intensity can be controlled by the modulation signal at a desired SAR frequency can be used. The use of lasers may have some advantages, because they can be modulated at very high rates, and because they lend themselves to precise control of the optical beamwidth. However, it is not necessary that the lasers have long-term coherency, and if many laser devices are employed simultaneously for the purpose of increasing the transmitter power, the individual lasers do not need to be coherently synchronized to each other.

Reflected optical signals 622 may be detected by a receive-transducer 614 that includes one or more light sensitive devices 618 such as photodiodes, phototransistors, Charge-Coupled Devices, photo-multiplier tubes, etc. FIG. 6 shows photodiodes 618 receiving reflected optical signals 622 through one or more optical elements 620. The intensity of reflected optical signals 622 is directly translated into output electrical signals by photodiodes 618 without the need for a mixer, optical down-converter, or a separately generated carrier signal. The output electrical signals are amplified by receive amplifiers 616 into received signals and then forwarded to waveform receiver 612 for conversion into digital signals as SAR-data for storing into SAR memory 302 via T/R controller 202.

Figure 7:
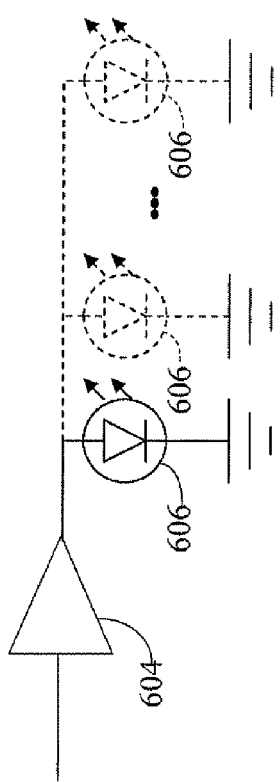
FIG. 7 shows an exemplary circuit diagram of a transmit-transducer.
Figure 8:
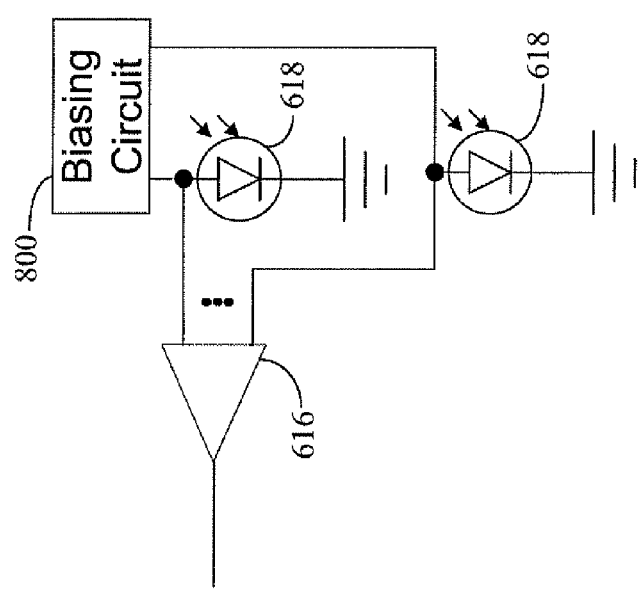
FIG. 8 shows an exemplary circuit diagram of a receive-transducer.

FIG. 7 shows a specific circuit example of one or more laser diodes 606 being driven by an amplifier 604. Multiple laser diodes can be connected to a single amplifier to increase power of the transmitted beam. FIG. 8 shows a photodiode 618, biased by biasing circuit 800, outputting electrical signals to receive amplifier 616. Here also, multiple photodiodes 618 may be used where multiple output electrical signals may be summed using a receive summing amplifier 616 and a summed value is output as the received signals to waveform receiver 612.

Returning to FIG. 6, optical elements 608 and 620 may include:
 1. One or more lenses to focus beam 108 and/or reflected optical signals,
 2. one or more polarization filters to generate beam 108 of a specific polarity or to receive reflected optical signals of a specific polarity, and
 3. one or more spectrum filters to irradiate target 110 with one or more specific frequencies and/or to receive reflected optical signals at one or more specific frequencies that are matched to the transmit frequencies.

As discussed above, depending on the information needed regarding a target, specific optical properties of beam 108 may be required. Such properties are obtained by one or more optical elements 608. For example, if multiple frequency ranges are desired to be simultaneously transmitted, transmitter 204 may use multiple amplifier/light emitters to concurrently transmit multiple frequency optical signals in beam 108, such as red, blue, and green to form a color image, for example. In this case, light emitting devices having substantial energy in wavelengths different from each other may be used. Alternatively or in addition, optical elements 620 may receive reflected optical signals 622 through red, blue, and green filters, for example.

Optical elements 608 and 620 may be implemented by disposing frequency filters and/or light polarizers in the path of optical signals 610 emitted from light emitting devices such as laser diodes 606 or in the path of reflected optical signals 622 before reaching light sensitive devices 618 such as photodiodes 618. For example, a specific frequency filter may be placed over each light emitting device. Although, for laser diodes 606, filters are most likely not needed because these devices emit light in a specific frequency range. However, if light emitters that emit white light are used, then light filters could be used to filter the emitted light. The light filters can be placed over light sensitive devices 618 such as photodiodes to select a specific frequency range. If lenses are needed to set a beamwidth, for example, these may also be similarly disposed in the path of emitted optical signals 610. Lenses may be used to receive reflected optical signals 622. As is well known, lenses may have actuating elements such as motors to change focal lengths and other optical properties if needed.

Light emitting devices 606 and associated optical elements 608 may be disposed relative to a mirror that is mounted with motorized gimbals for the vertical and azmuth directions so that a launch direction of beam 108 may be set to aim at target 110. Similarly, light sensitive devices 618 and optical elements 620 may be disposed relative to a mirror that is mounted with a second set of gimbals so that light from a specific direction may be received. As is well known, the gimbals may be set based on a platform position and orientation, and a location that beam 108 is to be aimed or a direction from which reflected optical signals 622 are to be received. As an example, U.S. Pat. No. 8,040,525, herein incorporated by reference, discloses a laser tracking device having a mirror mounted on motorized gimbals.

T/R controller 202 may control optical elements 608 and 620 by setting one or more values in optical-element-control-registers 607 and 619, for example. Optical-element-control-registers 607 and 619 control optical treatments (focus, polarity, frequency range, e.g., red, blue or green) of beam 108 prior to transmission and a treatment of reflected optical signals 622 before detection by light sensitive devices 618. T/R controller 202 may set values in optical-element-control-registers 607 and 619 while initializing transmitter 204 and receiver 206 prior to starting transmission of beam 108.

Figure 9:
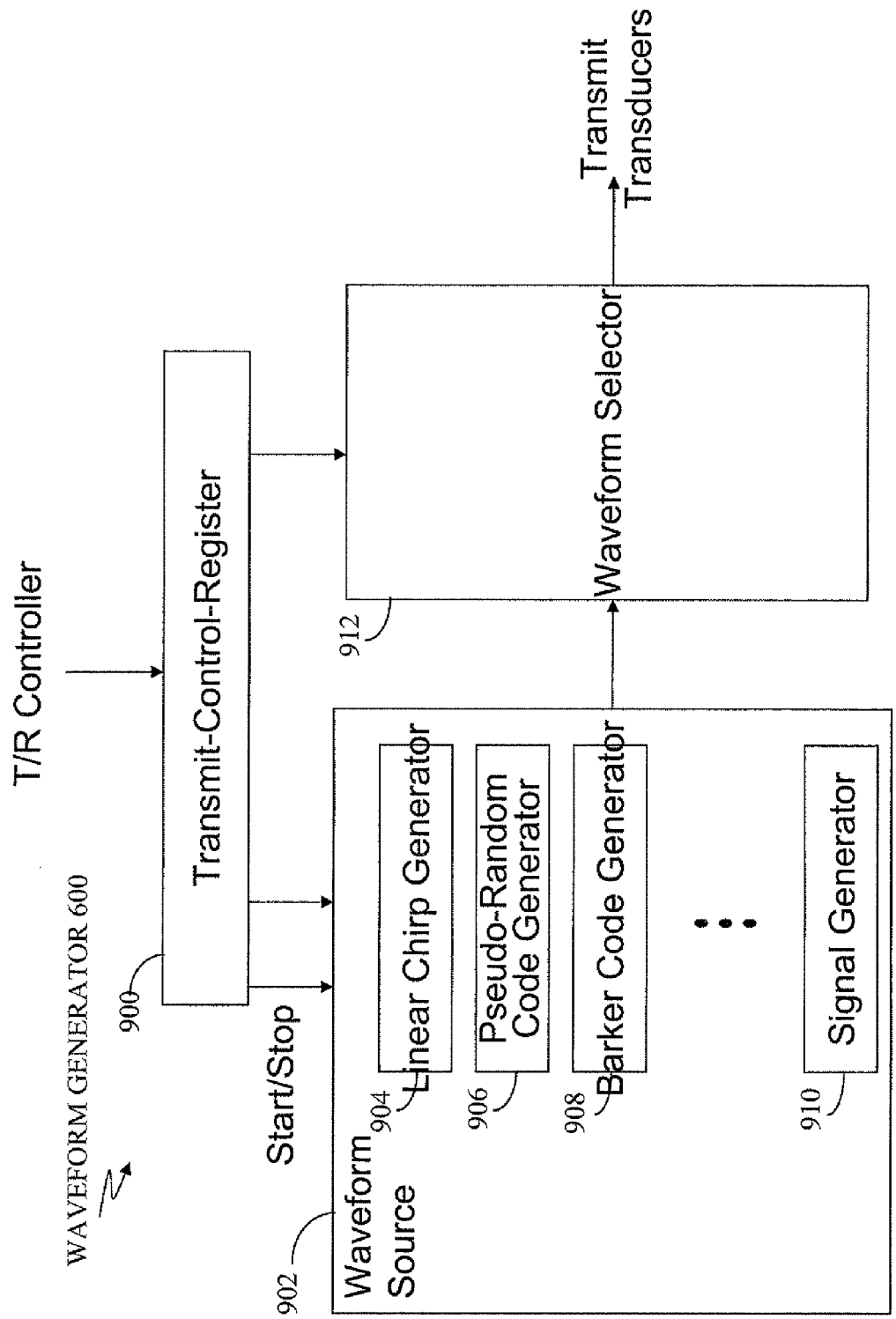
FIG. 9 shows an exemplary block diagram of a waveform generator.

FIG. 9 shows an exemplary block diagram of waveform generator 600 that may include a transmit-control-register 900, a waveform source 902, and a waveform selector 912. Waveform source 902 includes signal generators 904-910 such as one or more of linear chirp generators 904, pseudo-random code generators 906, Barker code generators 908, etc. Any type of signal generators may be used that is compatible with SAR applications such as a signal that has a high degree of auto-correlation, for example. Waveform generators 904-910 may be implemented by storing data representing a waveform in a memory and reading from the memory at a desired rate and starting at a desired location, for example.

Figure 10:
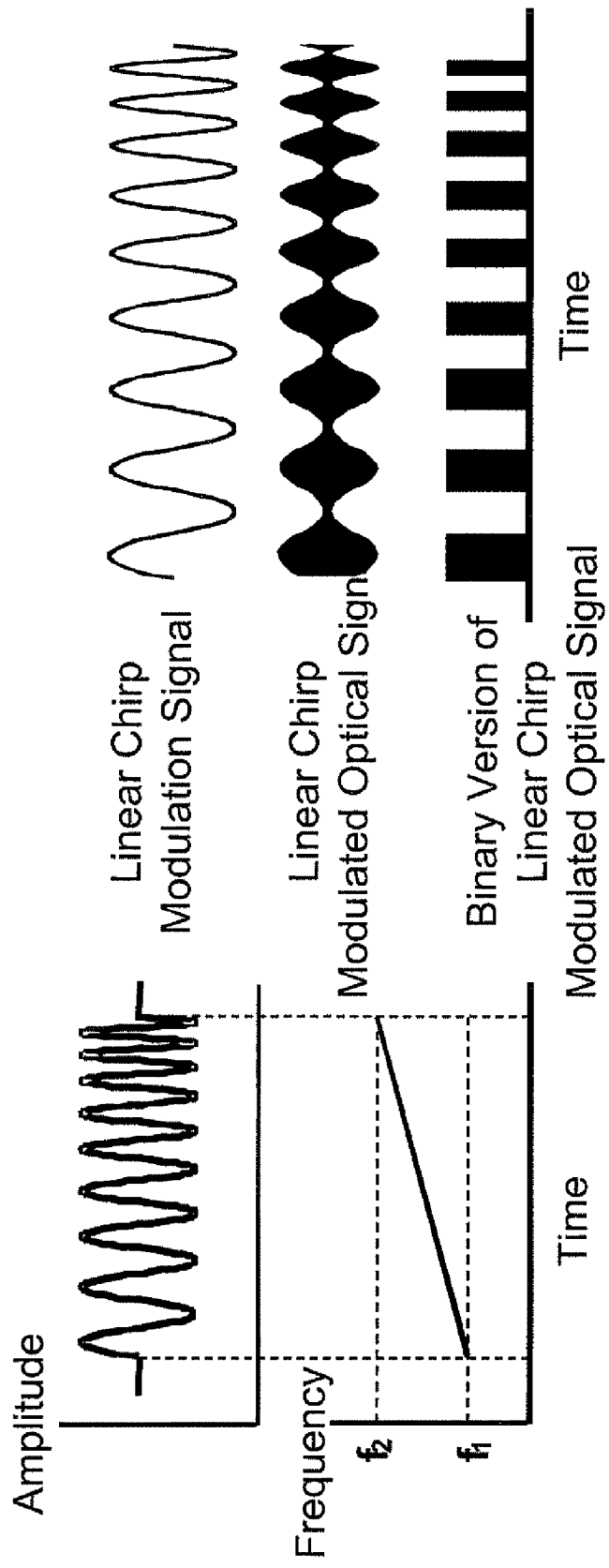
FIG. 10 shows exemplary linear chirp waveform diagrams.

FIG. 10 shows a linear chirp signal that is a signal whose frequency increases monotonically from a first frequency $f_1$ to a second frequency $f_2$, as shown on the left side of the figure. The top right of FIG. 10 again shows a linear chirp modulation signal. The middle right of FIG. 10 shows an optical signal's amplitude after modulating it with the linear chirp. The optical signal appears dark because the frequency of the optical signal is much higher than a frequency of the SAR modulation signals. Thus, there are many cycles of the optical signal for each cycle of the modulation signal. The bottom right of FIG. 10 shows an optical signal that is modulated with an alternative binary version of the linear chirp. This type of modulation has similar performance in terms of SAR processing as the linear chirp, but may have the advantage of being easier to produce with some types of optical emitters.

Figure 11:
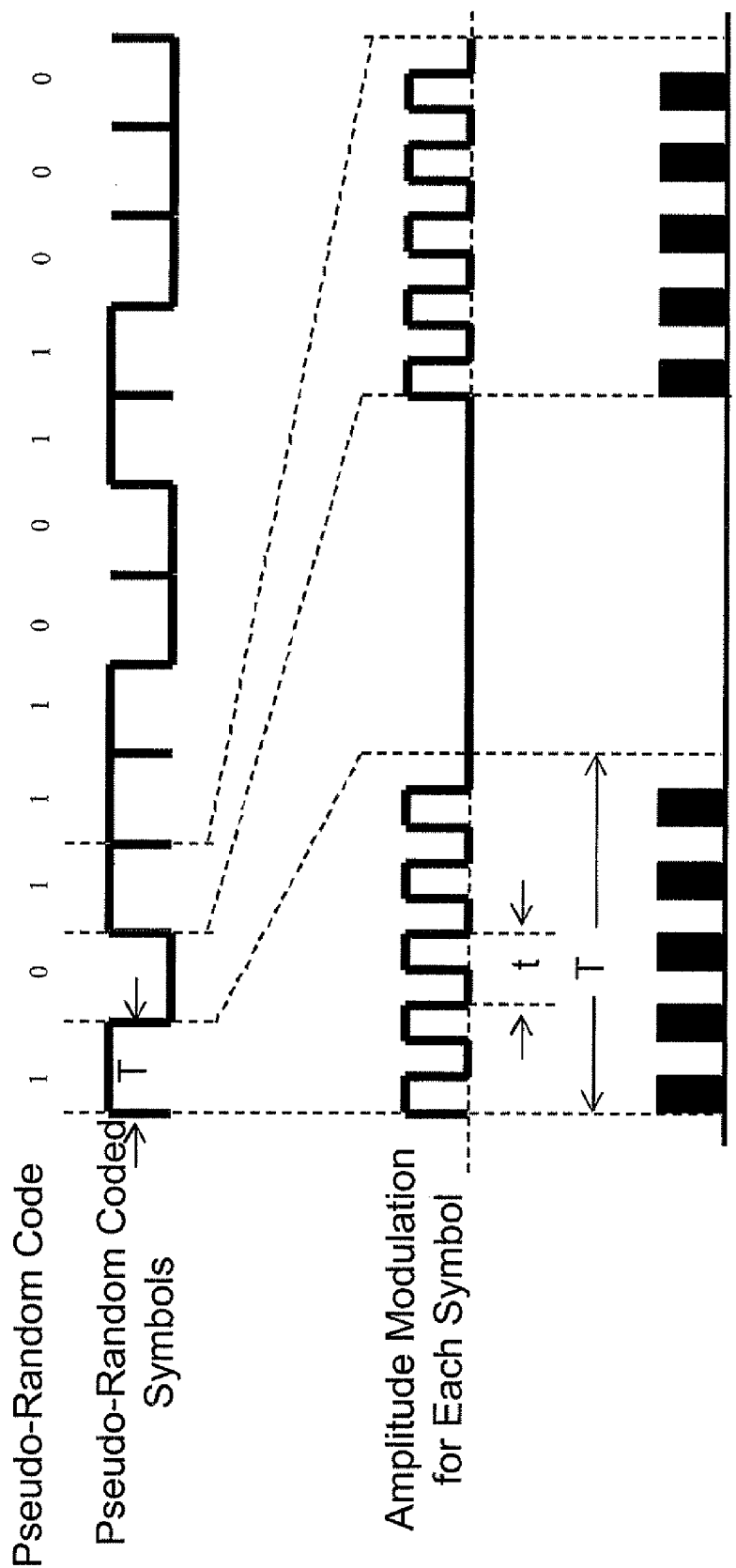
FIG. 11 shows exemplary pseudo-random code waveform diagrams.

FIG. 11 shows an alternative SAR waveform. A pseudo-random code example is shown where each bit of the pseudo-random code is allocated a symbol space of T time. Each symbol is represented by a fixed number of pulses. In FIG. 11, an example of 5 pulses per symbol is shown, where each pulse has a period of t time. The pulses of each symbol modulate the optical signal as shown by the bottom waveform where each pulse includes many cycles of the optical signal because the frequency of the optical signal is far greater than that of the modulation signal. Thus, when the pseudo-random code is a 1, five pulses of the optical signal are transmitted, and when the pseudo-random code is a 0, no pulses are transmitted for 5 t pulse time periods.

Yet another alternative SAR waveform uses Barker codes, which are transmitted similarly as for the pseudo-random code but the 1s and 0s are arranged according to the Barker code scheme. The Barker code is defined as a sequence of N values of +1 and −1 as follows:

$a_j$ for j=1, 2, ..., N such that $$\left| \sum_{j=1}^{N-v} a_j a_{j+v} \right| \leq 1$$

for all 1≤v≤N. This means that the autocorrelation of a barker code is between −1 and +1 for all non-zero shifts. Some known Barker codes are listed in the table below. If a binary 1 represents +1, a binary 0 represents −1, then the amplitude modulation using Barker codes is similar to the amplitude modulation using pseudo-random code except that the code bits are specified according to the Barker code scheme.

| Table of known Barker codes | | |
|---|---|---|
| Length | Code 1 | Code2 |
| 2 | +1 −1 | +1 +1 |
| 3 | +1 +1 −1 | |
| 4 | +1 +1 −1 +1 | +1 +1 +1 −1 |
| 5 | +1 +1 +1 −1 +1 | |
| 7 | +1 +1 +1 −1 −1 +1 −1 | |
| 11 | +1 +1 +1 −1 −1 −1 +1 −1 −1 +1 −1 | |
| 13 | +1 +1 +1 +1 +1 −1 −1 +1 +1 −1 +1 −1 +1 | |

Returning to FIG. 9, T/R controller 202 initializes transmit-control-register 900 by loading a bit pattern that arms one or more of signal generators 904-910 so that they are ready to start outputting modulation signals when a start command is received from T/R controller 202. Similarly, another bit pattern is loaded that controls waveform selector 912 to connect the armed signal generators to desired amplifiers 604 in transmit-transducer 602. For example, if transmitter 204 has a single amplifier 604 and if only linear chip is desired to be used as a modulation signal, linear chirp generator 904 is armed and waveform selector 912 is set to connect an output of linear chirp generator 904 to one amplifier 604. When the start command is received, linear chirp generator 904 begins outputting the linear chirp modulation signal, and transmit-transducer 602 begins to emit optical signals 610 directed at target 110.

If multiple signal generators 904-910 and/or multiple amplifiers 604 are desired to be used concurrently, then waveform selector 912 may be a M×N signal switch that is capable of connecting selected signal generators to appropriate selected amplifiers 604. For example, if red, blue, and green frequency bands are all desired, these colors are to be concurrently transmitted, and each of the colors are to be modulated with a different modulation signal, then three of signal generators 904-910 and three amplifiers 604 may be selected.

Figure 12:
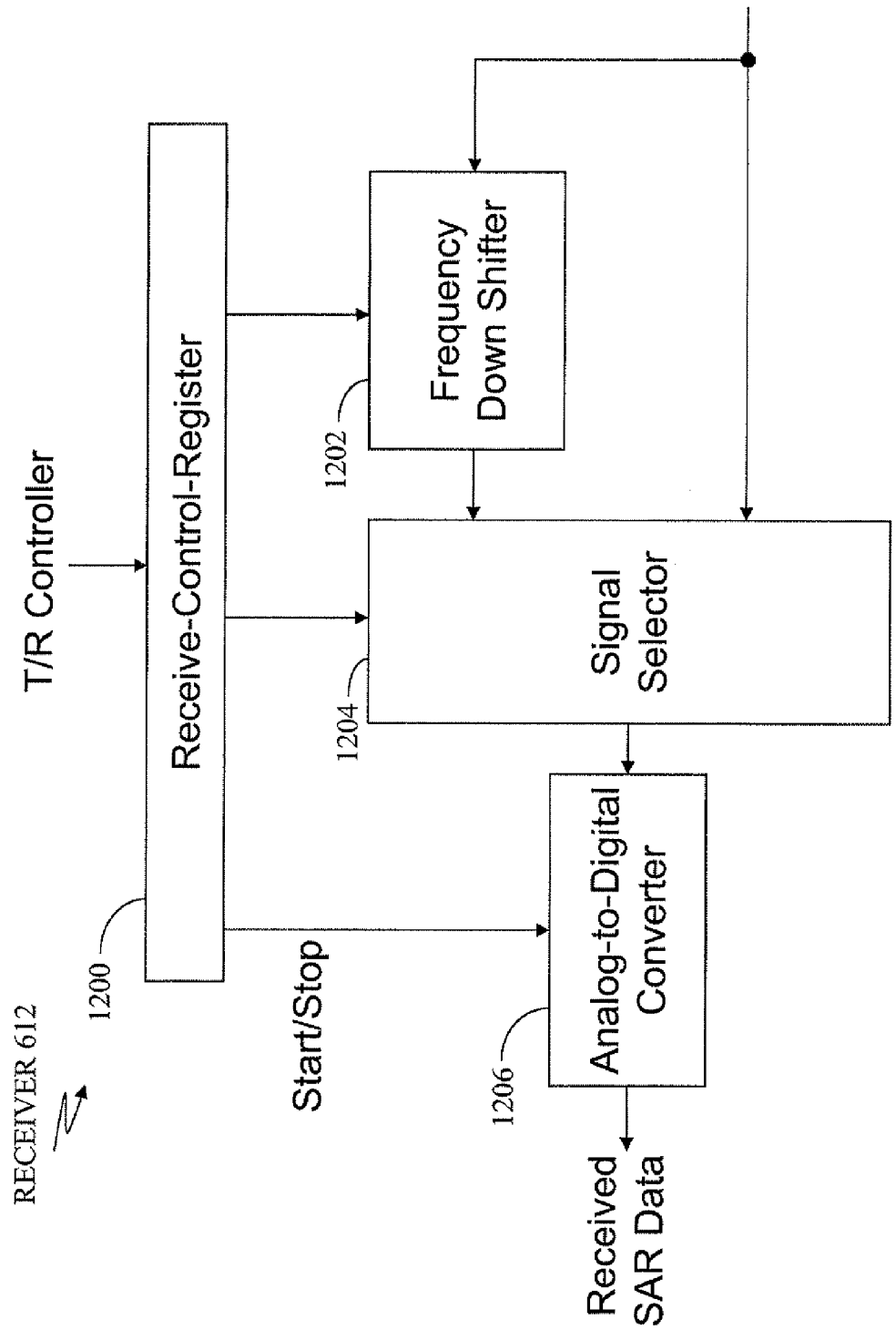
FIG. 12 shows an exemplary block diagram of a receiver.

FIG. 12 shows an exemplary block diagram of waveform receiver 612 that may include a receive-control-register 1200, a frequency-down-converter 1202, a signal selector 1204, and an analog-to-digital converter 1206. Received signals from amplifiers 616 may be connected directly to analog-to-digital converter 1206 for conversion into received SAR-data if the frequency range of the received signals is low enough. Current analog-to-digital converters may have speeds sufficient to process signal frequencies of up to about 1. GHz. If received signal frequency exceeds 1 GHz, then it may be necessary to first down-convert the received signals to a lower frequency more compatible with analog-to-digital converter 1206. If down-converting is required, an output of frequency-down-converter 1202 is connected to analog-to-digital converter 1206 instead of the received signals.

Frequency-down-converter 1202, signal selector 1204, and analog-to-digital converter 1206 are controlled by data stored in receive-control-register 1200. Bit fields may be dedicated to each of these components to control their functions. For example, frequency-down-converter 1202 may have capabilities to down-convert in different frequency ranges. Contents of receive-control-register 1200 may select a specific down-convert frequency amount. Additionally, frequency-down-converter 1202 may be turned off or put on standby mode if not needed to conserve power and reduce ambient noise. Signal selector 1204 is controlled by contents of receive-control-register 1200 to select the received signals or the output of frequency-down-converter 1202 as input to analog-to-digital converter 1206. Analog-to-digital converter 1206 may be controlled by a start/stop signal to time the SAR-data output so that SAR-data of a desired range is obtained.

Waveform receiver 612 may include multiple frequency-down-converters 1202, signal selectors 1204 and analog-to-digital converters 1206 to service multiple receive amplifiers 616. For example, if red, blue and green reflected signals are to be detected concurrently, each of the colors is received by a different receive amplifier 616. Received signals from amplifiers 616 are concurrently frequency down-converted, if needed, and converted to digital SAR-data by separate analog-to-digital converters 1206. As a second example, two analog-to-digital converters 1206 may be used concurrently to capture the real and imaginary channels of a complex signal from amplifiers 616 or frequency-down-converter 1202.

Figure 13:
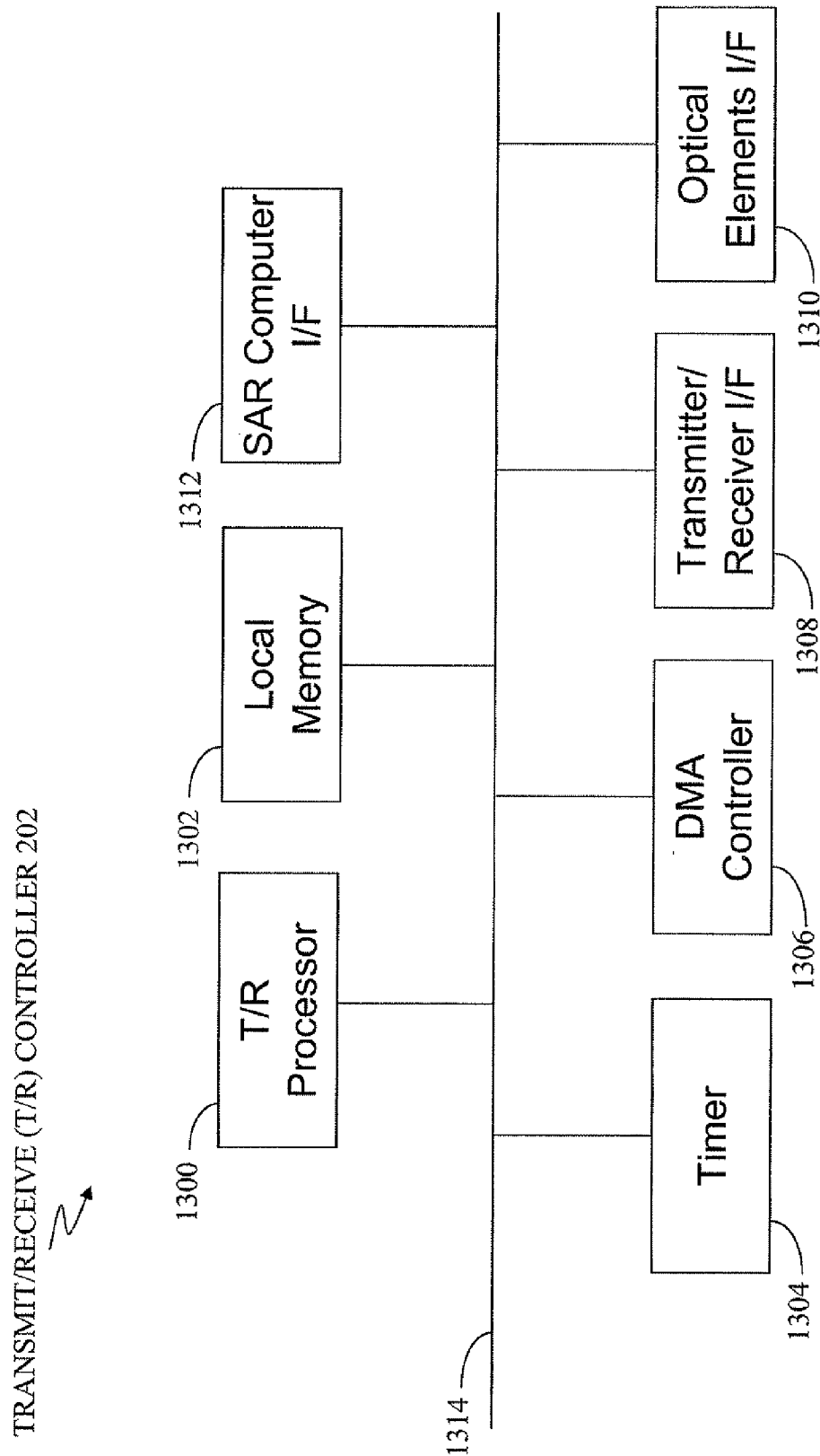
FIG. 13 shows an exemplary block diagram of a transmit/receive (T/R) controller.

FIG. 13 shows an exemplary block diagram of T/R controller 202 that may include a T/R processor 1300, a local memory 1302, a timer 1304, a DMA controller 1306, a transmitter/receiver I/F 1308, an optical elements I/F 1310, and a SAR computer I/F 1312. These components are coupled together by a bus 1314 configured in a bus architecture. As in FIG. 3 discussed in connection with SAR computer 200, the bus architecture is shown as an example for ease of explanation. Other types of connections may be used as is well known in the computer architecture art. T/R processor 1300 may be implemented by using a general-purpose computer or specialized computers implemented by hardware components such as Application Specific Integrated Circuits (ASICs), PLAs, PALs, FPGAs, etc. as is well known in the computer art. The functions performed by T/R processor 1300 may be implemented using software programs executing in either the general purpose or the special purpose computers.

SAR computer 200 and T/R controller 202 may be implemented by a single hardware unit that performs all the required functions with the beneficial result of fewer components and fewer interfaces. The functions of the SAR computer 200 and the T/R controller 202 may be software implemented with hardware interfaces to transmitter 204 and receiver 206.

An example of a SAR operation in T/R controller 202 may be as follows. After receiving a command for a SAR operation from SAR computer I/F 1312, T/R processor 1300 initializes waveform generator 600 and waveform receiver 612 by loading appropriate instructions in the form of bit patterns into transmit-control-register 900 and receive-control-register 1200. The instructions may be retrieved from a table stored in local memory 1302. The table may be indexed by possible commands that may be received from SAR processor 300. T/R processor 1300 similarly initializes optical-element-control-registers 607 and 619 to aim or focus beam 108 if needed and to set optical elements 608 and 620 to the various other optical treatment settings as may be commanded by SAR processor 300.

T/R processor 1300 determines memory allocations in SAR memory 302 that is reserved for the upcoming SAR operation. The memory allocations may be determined by the command sent from SAR processor 300, or determined by a generalized memory usage scheme. For example, a dedicated portion of SAR memory 302 may be allocated to operate in a swing buffer manner so that new SAR data is uploaded into one buffer while the another buffer is being read by the SAR processor 300. T/R processor may initialize DMA controller 1306 with addresses and buffer sizes. These parameters may be stored in local memory 1302, for example, so that SAR data received from waveform receiver 612 may be streamed into SAR memory 302 via SAR computer I/F 1312.

T/R processor 1300 initializes timer 1304 by setting timer-values that is determined by a range of interest. A first timer-value sets a time from a start of transmission of beam 108 to a start of analog-to-digital converter 1206 to begin generating SAR-data. A second timer-value sets a time between the start of transmission to a stop of transmission of beam 108. A third timer-value sets a time between the start of transmission to a stop of analog-to-digital converter 1206 to stop generating further SAR-data.

After timer 1304 is initialized, T/R processor 1300 issues a start command to timer 1304, and waveform generator 600. At this time, transmitter 204 may also respond to the start command by applying power to transmit-transducer 602 to begin transmitting beam 108. Transmit-transducer 602 may have been turned off or placed in standby mode to save power, for example. But it is not necessary to place the transmit-transducer 602 in an off or standby mode because receiver 206 can be controlled to receive only the signals of interest regardless of a state of transmitter 204. When the first timer-value expires, a start command is issued to analog-to-digital converter 1206 to begin generating the SAR-data. As analog-to-digital converter 1206 outputs portions of the SAR data, DMA controller 1306 uploads the outputted portions into SAR memory.

When the second timer-value expires, a stop transmission command is issued to waveform generator 600 to stop generating modulation signals. At this time, transmit-transducer 602 may be returned to off or standby mode or simply permitted to continue transmitting. Receiver 206 is independently controlled to receive the desired reflected optical signals. Analog-to-digital converter 1206 continues to output SAR-data portions because reflected optical signals 622 resulting from a desired portion of transmitted beam 108 may still be received. When the third timer-value expires, a stop command is issued to analog-to-digital converter 1206 because SAR data generation is completed. DMA controller 1306 also receives this stop command and stops streaming data from analog-to-digital converter 1206 to SAR memory 302. When the commanded SAR operation is completed, T/R processor 1300 returns an operation-completed message to SAR processor 300. After receiving the operation completed message, SAR processing may proceed to process the SAR-data to obtain desired information such as images and target data such as motion detection and automatic target recognition, for example.

The above example relates to a single transmission of a single beam. However, as discussed above, transmitter 204 and receiver 206 are capable of more complex SAR operations. For example, concurrent or fast sequential transmissions of multiple beams 108 of different optical frequency ranges and/or different optical properties such as different polarizations are possible. For fast sequential operation, the transmit-control-register 900, receive-control-register 1200, optical-element-control-registers 607 and 619 and DMA controller 1306 may be capable of instruction stacks arranged in a FIFO (first-in-first-out) configuration, for example. Similarly, timer-values in timer 1304 may be in multiple groups where each group controls one transmission event. In this way, a rapid sequence of beams 108 may be transmitted corresponding to each point 114 of a synthetic aperture.

Figure 14:
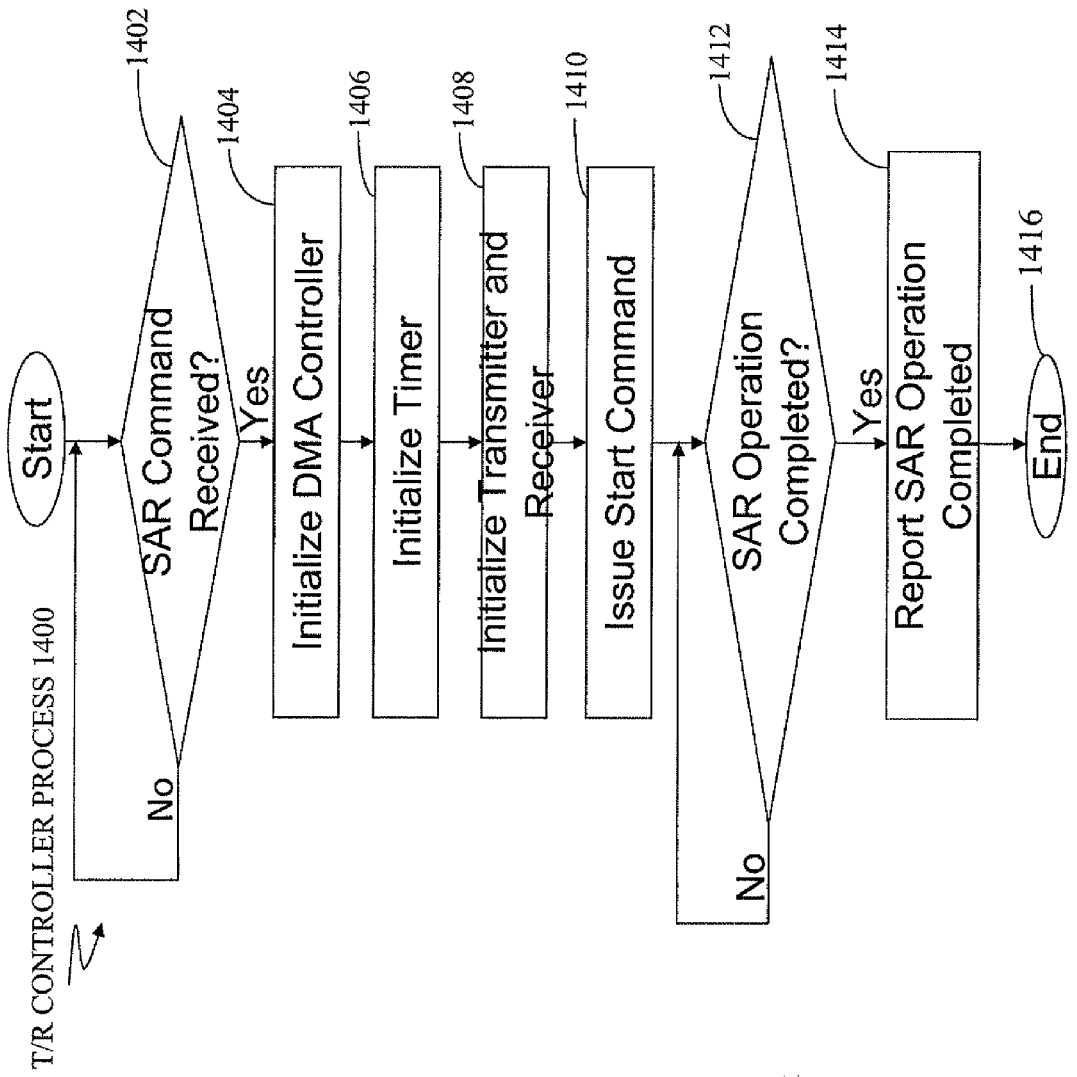
FIG. 14 shows an exemplary flow chart for a T/R controller process.

FIG. 14 shows a flow-chart 1400 of an exemplary process for T/R controller 202. In step 1402, the process checks if a SAR command has been received from SAR processor 300. If a SAR command has been received, the process goes to step 1404. Otherwise, the process returns to step 1402. In step 1404, the process initializes DMA controller 1306 to upload SAR-data to allocated address locations in SAR memory 302, and goes to step 1406. DMA controller 1306 may be designed to follow a predetermined memory usage scheme, in which case initializing address allocation would not be necessary and the process arms DMA controller 1306 to be prepared for the upcoming SAR-data.

In step 1406, the process initializes timer 1304 for sequencing transmitter 204 and receiver 206 to transmit beam 108 and receive reflected optical signals 622 for a range of interest, and the process goes to step 1408. For example, first, second and third timer-values of timer 1406 may be set to the desired values. These timer-values determine the time to start analog-to-digital converter 1206, the time to stop waveform generator 600 and transmit-transducer 602, and the time to stop analog-to-digital converter 1206 relative to the start of transmission of beam 108. In step 1408, the process initializes transmit-control-register 900, optical-element-control-register 607 of transmitter 204, receive-control-register 1200, and optical-element-control-register 619 of receiver 206, and the process goes to step 1410.

In step 1410, the process issues a start command to timer 1304, DMA controller 1306 and waveform generator 600 to begin a SAR operation, and the process goes to step 1412. In step 1412, the process checks if the SAR operation is completed. If the SAR operation is completed, the process goes to step 1414. Otherwise, the process returns to step 1412. In step 1414, the process reports To SAR processor 300 that the SAR operation has completed, goes to step 1416 and ends.

Figure 15:
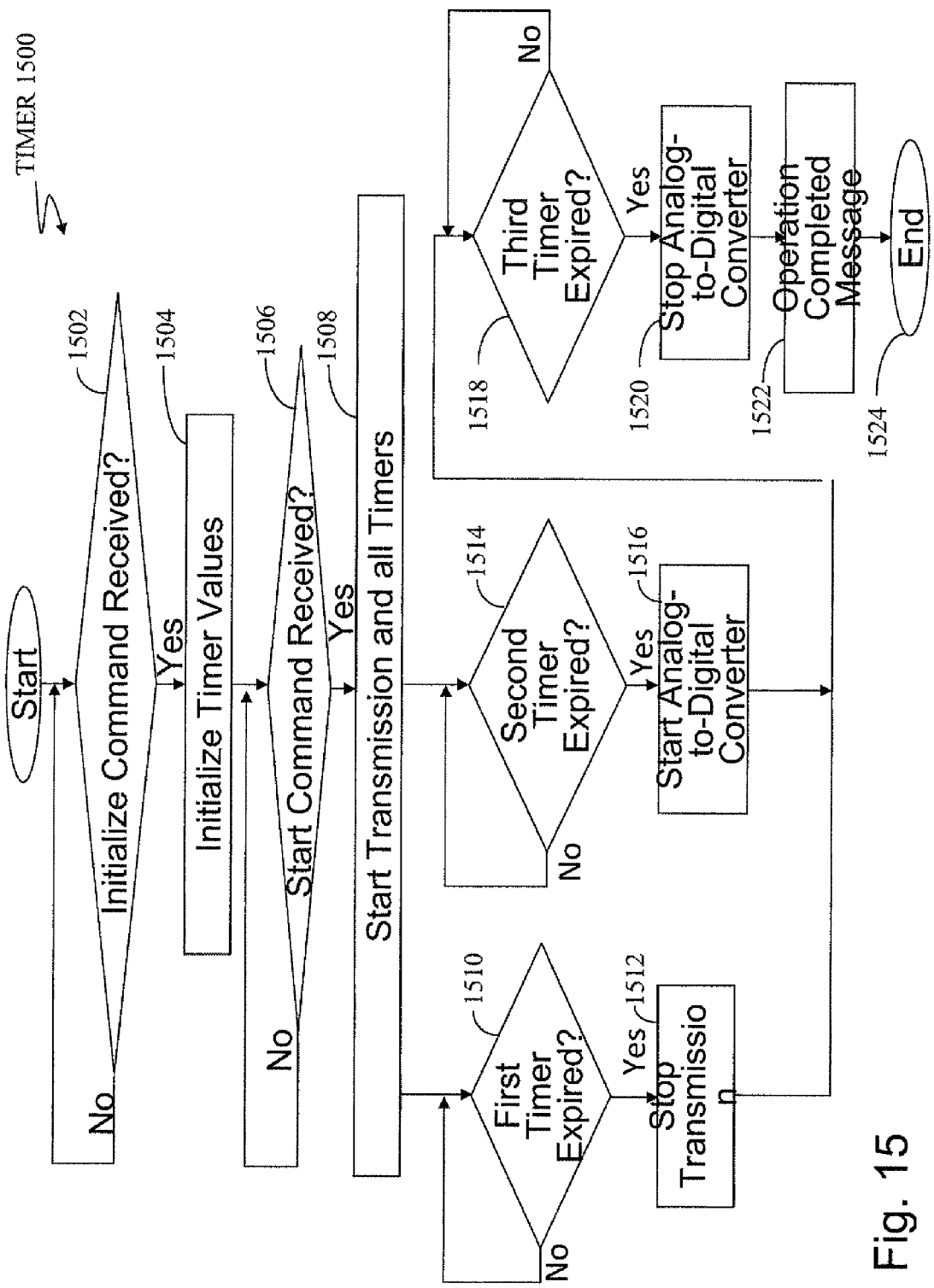
FIG. 15 shows an exemplary flow chart of a timer process.

FIG. 15 shows a flow-chart 1500 of an exemplary process of timer 1304 for transmission of a single beam 108 for a single frequency as opposed to a sequence of beams 108 of multiple frequencies. In step 1502, the process checks if an initialize command has been received. If an initialize command has been received, the process goes to step 1504. Otherwise, the process returns to step 1502. In step 1504, the process initializes all timer values such as first, second and third timer-values, for example, and the process goes to step 1506. In step 1506, the process checks if a start command has been received. If a start command has been received, the process goes to step 1508. Otherwise, the process returns to step 1506. In step 1508, the process starts required timers, and the process goes to steps 1510 and 1514 concurrently. For example, for a single transmission of beam 108 of a single frequency, first, second and third timers (corresponding to the first, second and third timer values) are started. Also, here it is assumed that the third timer value is larger than the first and second timer values, because, normally, analog-to-digital converter 1206 should not be turned off before it was started and before the transmission of beam 108 has ended.

In step 1510, the process checks if the first timer has expired. If the first time has expired, the process goes to step 1512, stops transmission of beam 108 and then goes to step 1518. Otherwise, the process returns to step 1510. In step 1514 and concurrently with steps 1510 and 1512, the process checks if the second timer has expired. If the second timer has expired, the process goes to step 1516 and starts analog-to-digital converter 1206 and goes to step 1518. Otherwise the process returns to step 1514.

In step 1518, the process checks if the third timer has expired. If the third timer has expired, then the process goes to step 1520. Otherwise, the process returns to step 1518. In step 1520, the process stops analog-to-digital converter 1206 and goes to step 1522. In step 1522, the process sends a message to T/R controller 202 that the SAR operation is completed and goes to step 1524 and ends.

Figure 16:
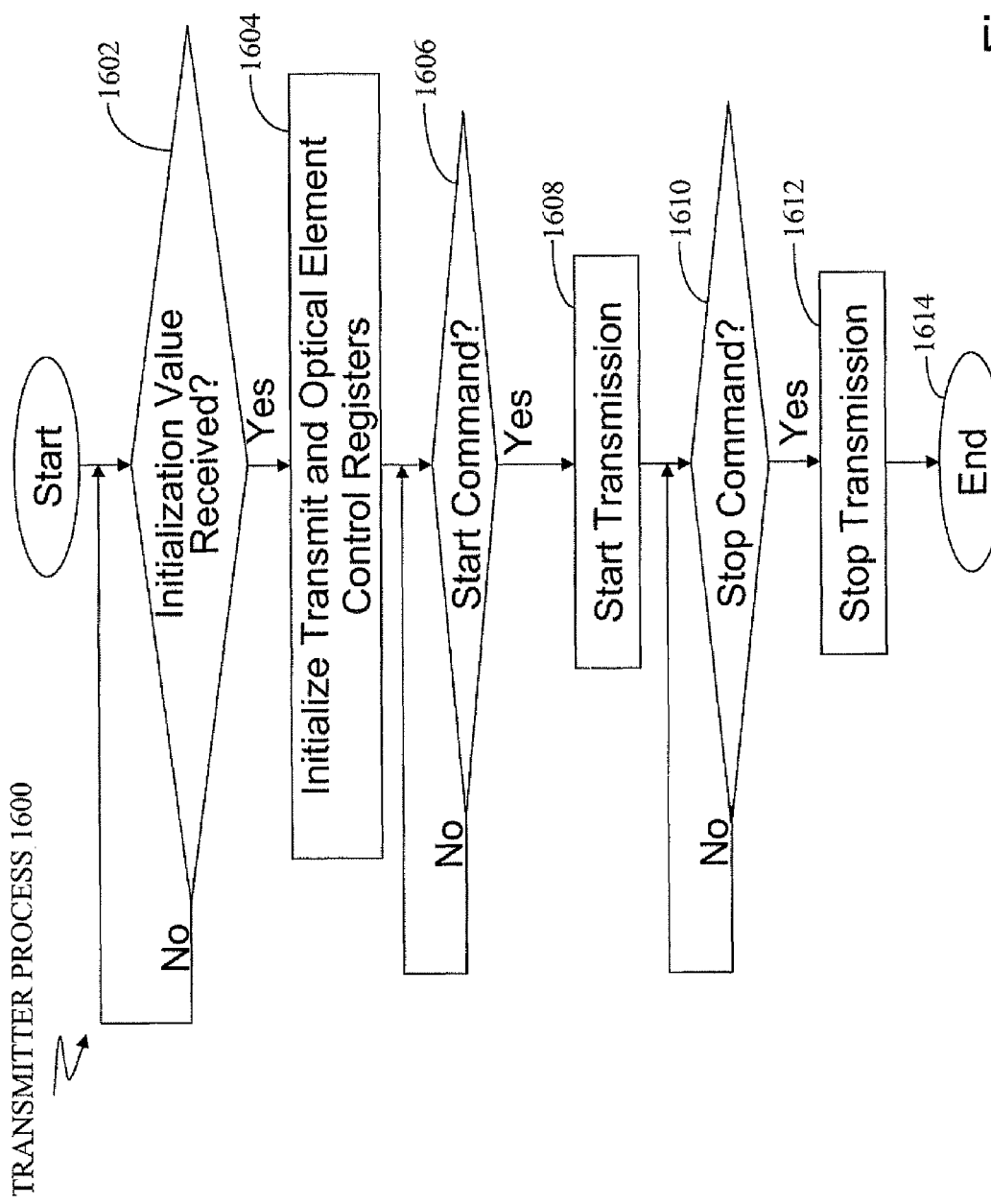
FIG. 16 shows an exemplary flow chart of a transmitter process.

FIG. 16 shows a flow-chart 1600 of an exemplary process for transmitter 204. For ease of explanation, it is assumed that only a single beam 108 is being transmitted at a single frequency range. As noted above, if a more complex transmission is desired such as rapid sequential transmission of multiple beams at multiple frequencies, transmit-control-register 900 and optical-element-control-register 607 may in fact be stacks operating like FIFOs, for example. In such cases, a sequencer may be added to sequence the actions of transmitter 204.

In step 1602, the process checks if an initialization value has been received. If an initialization value has been received, the process goes to step 1604. Otherwise, the process returns to step 1602. In step 1604, the process initializes the transmit-control-register 900 and optical-element-control-register 607 based on the initialization value and goes to step 1606. The optical elements 608 changes to the settings loaded into the optical-element-control-register 607, and waveform generator 600 selects the specific ones of amplitude modulation waveform generators 904-910, and changes these components into active mode from off or standby mode if not already in the active mode. Also, waveform selector 912 is set to the selection indicated in transmit-control-register 900. In step 1606, the process checks if a start command has been received. If a start command has been received, the process goes to step 1608, starts the selected one of amplitude modulation generators 904-910 and goes to step 1610. Otherwise, the process returns to step 1606. The amplitude modulation signal generated by the selected amplitude modulation generator 904-910 is connected to a selected amplifier 604 which modulates the amplitude of the optical signal emitted by one or more optical light elements 606 to generate an amplitude modulated optical signal. The amplitude modulated optical signal is transmitted through optical elements 608 to form beam 108 directed at target 110.

In step 1610, the process checks if a stop command has been received. If a stop command has been received, the process goes to step 1612, places waveform generators 904-910 and transmit-transducer 602 to standby or off mode, goes to step 1614 and ends. As noted above, transmitter 204 may continue to function without affecting the SAR operation. However, in the interest of conserving power, the various components of transmitter 204 may be turned off or placed in a power saving mode such as a standby mode, for example. If a stop command has not been received, the process returns to step 1610.

Figure 17:
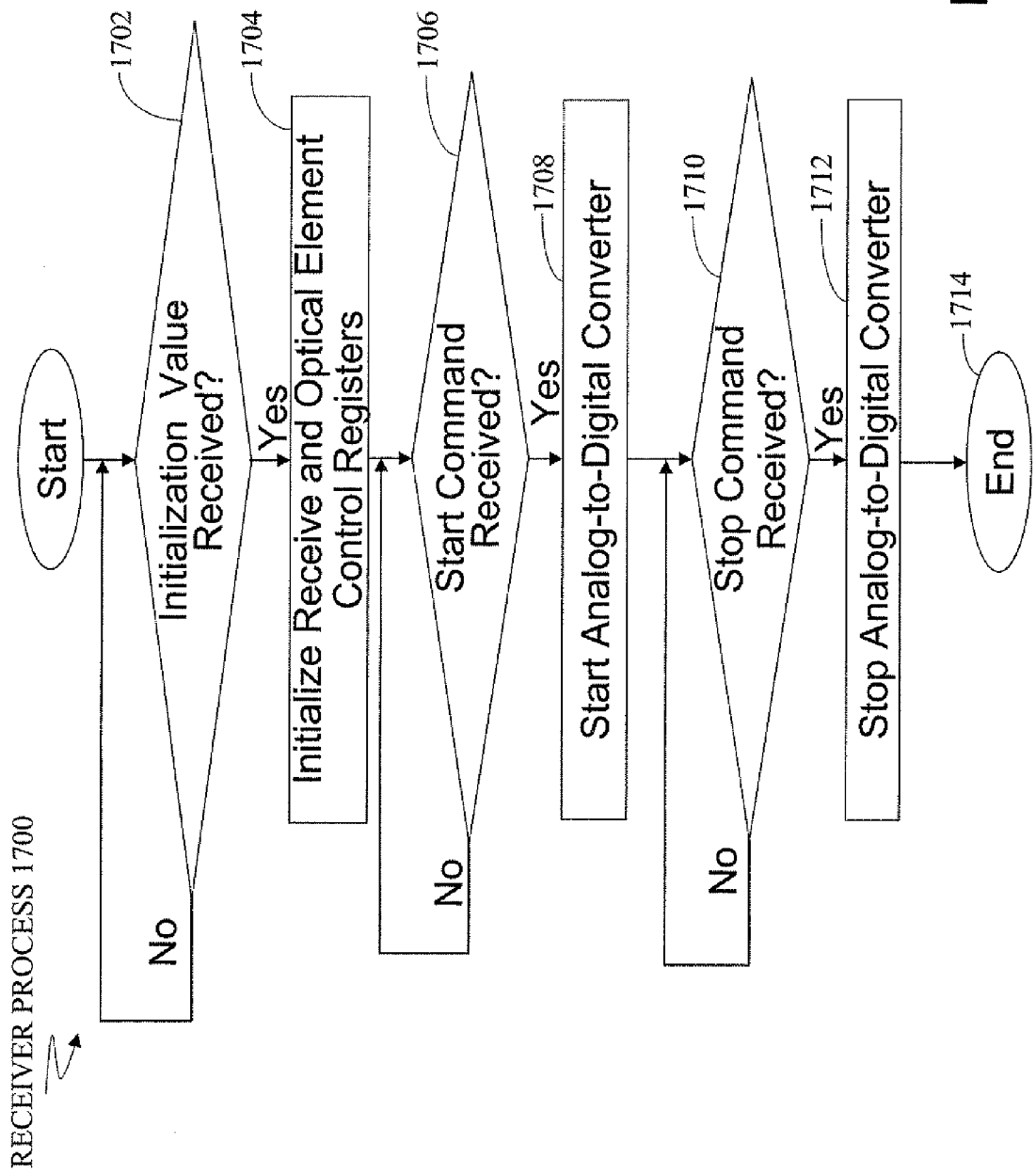
FIG. 17 shows an exemplary flow chart of a receiver process.

FIG. 17 shows a flow-chart 1700 of an exemplary process for receiver 206. For ease of explanation, it is assumed that only a single beam 108 has been transmitted at a single frequency range. As noted above in connection the transmitter, if a more complex transmission is desired such as rapid sequential transmission of multiple beams at multiple frequencies, receive-control-register 1200 and optical-element-control-register 619 may in fact be stacks operating like FIFOs, for example. In such cases, a sequencer may be added to sequence the actions of receiver 206.

In step 1702, the process checks if an initialization value has been received. If an initialization value has been received, the process goes to step 1704. Otherwise, the process returns to step 1702. In step 1704, the process sets receive-control-register 1200 and optical-element-control-register 619 based on the initialization value and goes to step 1706. Analog-to-digital converter 1206, signal selector 1204 and frequency-down-shifter 1202 are set according to the contents of receive-control-register 1200. Optical elements 620 are set to states according to the contents of optical-element-control-register 619. These components may have been turned off or placed in a standby mode to conserve power. In such a case, these components are placed in an active mode ready to immediately process reflected optical signals 622. In step 1706, the process checks if a start command has been received. If the start command has been received, the process goes to step 1708. Otherwise, the process returns to step 1706.

In step 1708, the process starts analog-to-digital converter 1206 to begin generating SAR-data and outputting the SAR-data to DMA controller 1306 for storing in SAR memory 302, and the process goes to step 1710. In step 1710, the process checks if a stop command has been received. If a stop command has been received, the process goes to step 1712, stops analog-to-digital converter 1206 from generating further SAR-data, goes to step 1714 and ends. Otherwise, the process returns to step 1710. Again, when the stop command is received, various components of receiver 612 may be turned off or placed in a standby mode to save power.

While the invention has been described in conjunction with exemplary embodiments, these embodiments should be viewed as illustrative, not limiting. Various modifications, substitutes, or the like are possible within the spirit and scope of the invention.

What is claimed is:

1. An optical synthetic aperture radar, SAR, apparatus comprising:
    an optical signal source capable of generating a plurality of optical signals, each of the optical signals having substantial energy in a wavelength that is different from wavelengths of other ones of the optical signals;
    a modulation signal source capable of generating a modulation signal;
    a transmitter capable of generating an optical amplitude modulated signal by amplitude modulating the optical signals with the modulation signal, and transmitting the optical amplitude modulated signals in a beam at a target;
    a receiver that receives reflected optical signals resulting from the optical amplitude modulated signals that were transmitted, the receiver including a plurality of light detectors that are capable of detecting reflected optical signals having wavelength ranges substantially the same as the wavelength ranges of the optical signals; and
    a SAR processor, wherein the receiver outputs a plurality of received signals corresponding to a number of light detectors, the SAR processor inputting and processing SAR-data generated based on the received signals and generating at least one of an image and a moving-target-indication.

2. The apparatus of claim 1, wherein the receiver comprises:
    a light detector capable of detecting the reflected optical signals and generating a received signal, the received signal being an envelope of the reflected amplitude modulated optical signals; and
    a waveform receiver, the waveform receiver converting the received signal into SAR-data and outputting the SAR-data.

3. The apparatus of claim 2 further comprising a synthetic aperture radar processor, SAR processor wherein the SAR processor inputs and processes the SAR-data and generates at least one of an image and moving-target-indication.

4. The apparatus of claim 1, wherein the light detector is one or more of:
    a photodiode;
    a photo transistor;
    a Charge Coupled Device; and
    a photo-multiplier tube.

5. The apparatus of claim 1 further comprising one or more first optical elements, wherein the first optical elements are capable of processing the transmitted optical signals to have a first specified polarity.

6. The apparatus of claim 5 further comprising one or more second optical elements, wherein the second optical elements are capable of processing the reflected optical signals to have a second specified polarity.

7. The apparatus of claim 1, wherein the modulation signal is one or more of:
    an analog FM linear chirp;
    a binary FM linear chirp;
    a pseudo-random binary code; and
    a plurality of barker codes.

8. The apparatus of claim 1, wherein the optical signal source comprises one or more of:
    a light emitting diode (LED);
    a semiconductor laser diode;
    a solid-state laser,
    a gas laser; and
    a fiber laser.

9. A method for performing optical synthetic aperture radar comprising:
    providing a plurality of optical signals, each of the optical signals having substantial energy in a wavelength that is different from wavelengths of other ones of the optical signals;
    providing a modulation signal;
    amplitude modulating the optical signals based on the modulation signal to generate a plurality of modulated optical signals;
    transmitting the amplitude modulated optical signals in a beam at a target; and detecting reflected optical signals resulting from the modulated optical signals transmitted toward the target, the reflected optical signals having wavelength ranges substantially the same as wavelength ranges of the optical signals.

10. The method of claim 9 further comprising:
receiving in a light detector the reflected optical signals, the reflected signal being a result of the amplitude modulated optical signals that were transmitted at the target;
demodulating the reflected signals in the light detector to recover a received signal from the amplitude modulation of the reflected signals; and
generating SAR-data based on the received signal.

11. The method of claim 10 further comprising:
first optically processing the amplitude modulated optical signals before transmitting the beam; and
second optically processing the reflected optical signals before the reflected optical signals are detected by the light detector.

12. The method of claim 11, wherein the first optical processing includes one or more of:
setting a polarity of the amplitude modulated optical signals; and
setting a frequency range of the amplitude modulated optical signals;
setting a launch direction of the modulated optical signals;
setting a beamwidth of the modulated optical signals; and
wherein the second optically processing includes one or more of:
setting a polarity of the reflected optical signals that are detected by the light detector;
setting a frequency range of the reflected optical signals that are detected by the light detector;
setting a direction from which the reflected optical signals are received; and
setting a range of angles from which the reflected optical signals are received.

13. The method of claim 9, wherein the modulation signal includes one or more of:
an analog FM linear chirp;
a binary FM linear chirp;
a pseudo-random binary code; and
a plurality of barker codes.

14. An optical SAR system comprising:
a transmitter capable of generating an optical amplitude modulated signal by amplitude modulating an optical signal with an amplitude modulation signal, and transmitting the optical amplitude modulated signal in a beam at a target, the transmitter including:
means for generating the amplitude modulation signal,
means for modulating the optical signal with the amplitude modulation signal to generate the amplitude modulated optical signal and
means for optically processing the amplitude modulated optical signal;
a receiver capable of generating a received signal by receiving a reflected optical signal resulting from the optical amplitude modulated signal that was transmitted, and generating SAR-data based on the received signal, the receiver including:
mean for detecting the reflected optical signal to obtain an amplitude modulation signal of the reflected signal,
means for optically processing the reflected optical signal before detecting the reflected optical signal, and
means for converting the amplitude modulation signal of the reflected optical signal into the SAR-data; and
a SAR computer capable of processing the SAR-data to generate one or more of an image, moving-target indication, automatic target recognition and automatic change detection.

15. The system of claim 14 further comprising:
means for controlling the transmitter and receiver;
means for controlling a waveform generator and first optical elements of the transmitter;
mean for controlling a waveform receiver and second optical elements of the receiver;
means for storing SAR-data for processing by SAR computer; and
means for transferring SAR-data from the receiver to the means for storing SAR-data.

* * * * *